United States Patent [19]

Haglund

[11] Patent Number: 4,587,948
[45] Date of Patent: May 13, 1986

[54] PORTABLE GAS-FIRED COOKING DEVICE

[75] Inventor: Allen Haglund, Vancouver, Canada

[73] Assignee: Camper Delight Sales Corp., Vancouver, Canada

[21] Appl. No.: 713,803

[22] Filed: Mar. 20, 1985

[30] Foreign Application Priority Data

Jan. 23, 1985 [CA] Canada .................. 472689

[51] Int. Cl.⁴ .............................. F24C 3/14
[52] U.S. Cl. .......................... 126/38; 126/2; 126/9 R; 126/25 R; 126/41 R; 99/449
[58] Field of Search .............. 126/2, 9 R, 38, 40, 126/39 H, 25 R, 41 R; 99/339, 449, 450; 220/68, 469

[56] References Cited

U.S. PATENT DOCUMENTS

| Re. 24,296 | 3/1957 | Stewart | 219/35 |
|---|---|---|---|
| 2,742,893 | 4/1956 | Keffer | 126/38 |
| 3,559,633 | 2/1971 | Born et al. | 126/38 |
| 3,638,634 | 2/1972 | Bolitho | 126/41 R |
| 3,753,431 | 8/1973 | Koziol | 126/38 |
| 3,789,821 | 2/1974 | Fick et al. | 126/38 |
| 4,442,824 | 4/1984 | Amici | 126/14 |
| 4,446,846 | 5/1984 | Hahn | 126/25 R |

Primary Examiner—Samuel Scott
Assistant Examiner—Allen J. Flanigan

[57] ABSTRACT

A portable cooking device comprising a housing having two cooking sections hinged together along a respective side wall whereby the sections may be disposed side by side with their open ends facing upwardly and displaceable to be juxtaposed with their open ends facing one another. Each section has a bottom wall, opposed side walls and opposed end walls. One of the cooking sections has a heat generating element secured therein beneath a heat transmitting support frame. The other concave section has a gas burner assembly supportable on the bottom wall thereof below a further heat transmitting support frame. The assembly has an open top end pan with a gas burner element disposed substantially centrally therein. A flame shield is disposed over the burner. A secondary heat deflection support plate maintains the pan spaced from the bottom wall and the side and end walls. The pan is also ventilated by vent openings provided in the side and end walls of the cooking section.

18 Claims, 8 Drawing Figures

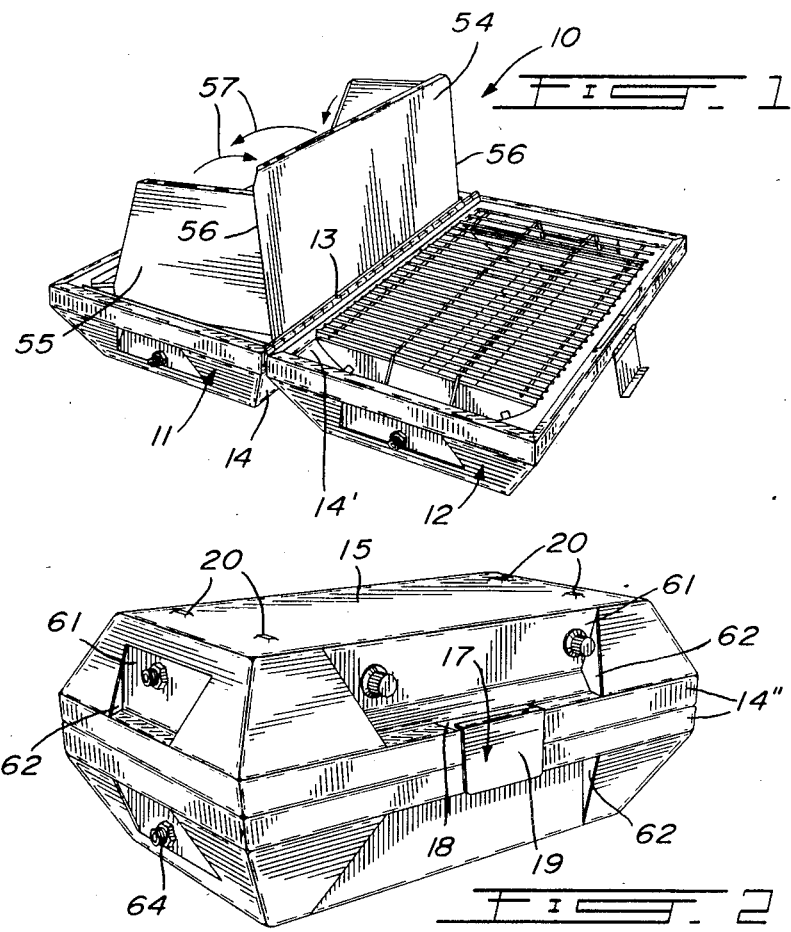
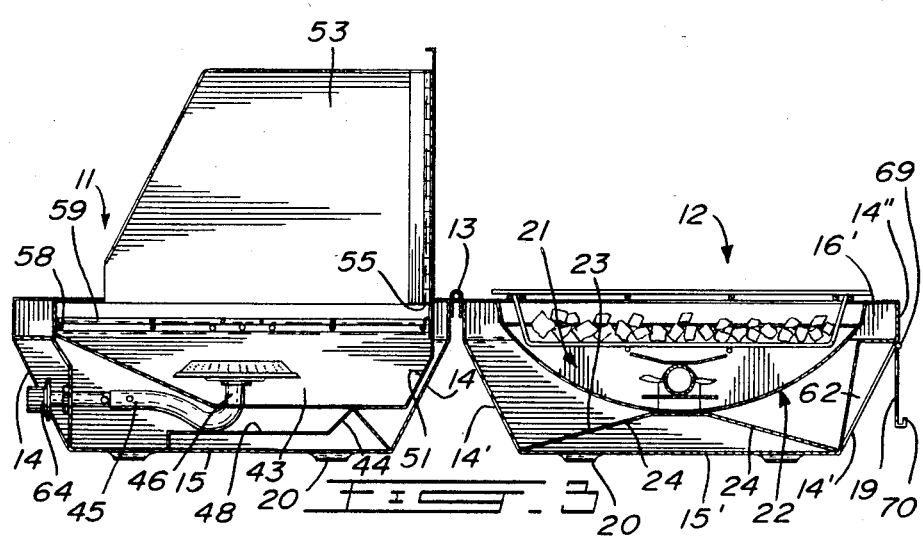

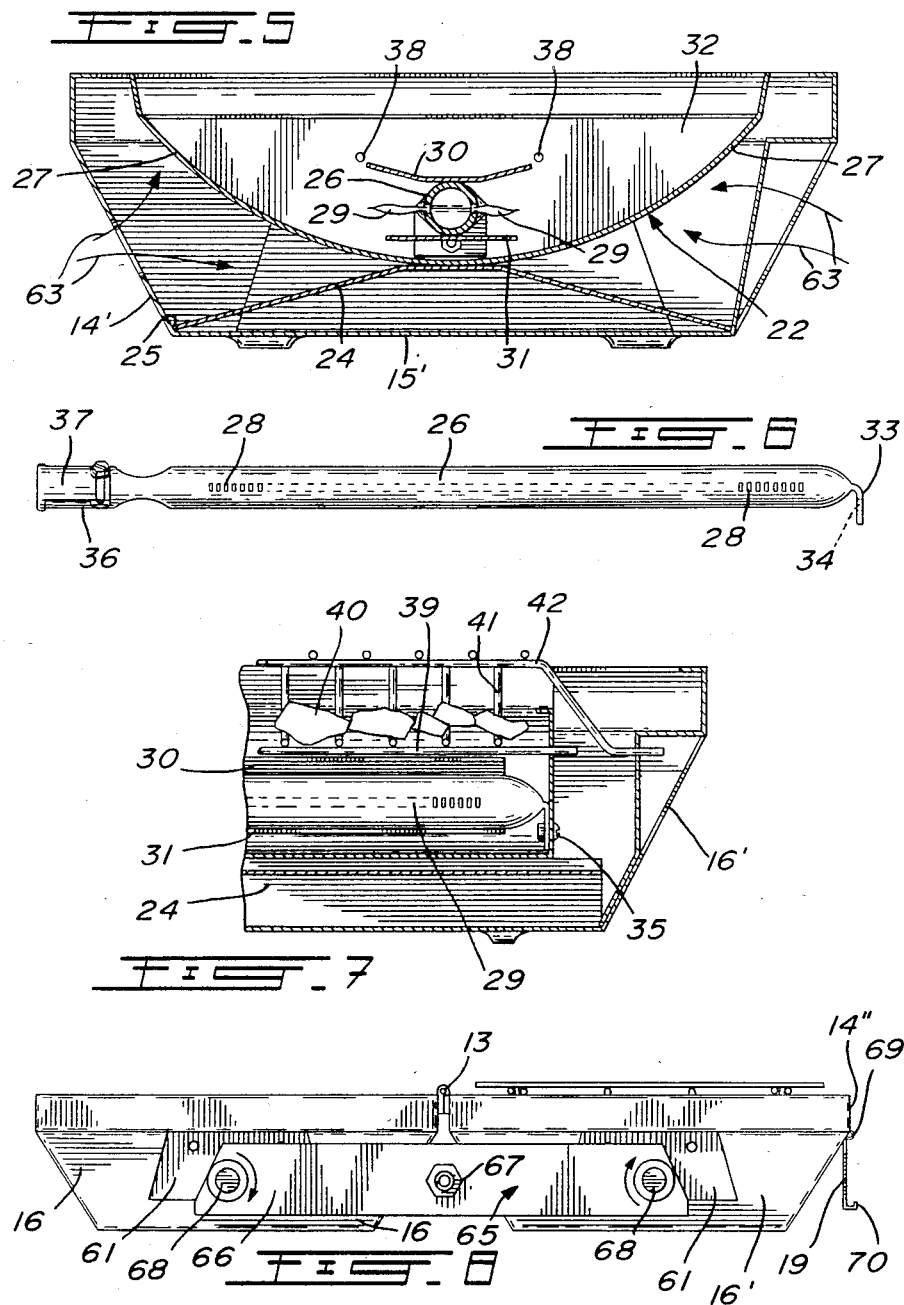

PORTABLE GAS-FIRED COOKING DEVICE

BACKGROUND OF INVENTION (a) Field of the Invention

The present invention relates to an improved portable cooking device comprised of a housing having two cooking sections hinged together and disposable in side-by-side relationship to constitute two separate cooking sections and wherein one of the sections is a gas-fired barbecue and the other a gas-fired camp stove with both sections having component parts that can be dismantled for ease of cleaning and repair.

(b) Description of Prior Art

Portable cooking devices are known such as camp stoves or barbecues, but these have many disadvantages such as being bulky and heavy to carry, unsafe to operate, and difficult to clean. Further, these portable type cooking devices usually provide a single cooking section in a base portion thereof and the other section is utilized as a cover. If both sections have heating elements therein, such as electric heating plates, then both sections are superposed whereby to cook foodstuff in between them. Still further, many such portable cooking devices are unsafe to use on a wooden surface such as a table, as the casing thereof overheats and could burn the surface. Still further, many such devices are not self-contained in that accessory parts must be provided separately from the portable unit whereby to complete the assembly of the cooking device when in use.

SUMMARY OF INVENTION

It is a feature of the present invention to provide an improved portable cooking device which substantially overcomes all of the above-mentioned disadvantages of the prior art.

Another feature of the present invention is to provide a portable cooking device which consists of two cooking sections hinged together along a common edge and disposable in a side-by-side relationship whereby to provide two separate cooking compartments, wherein one compartment is a camp stove cooking section and the other is a gasfired barbecue cooking section.

Another feature of the present invention is to provide an improved portable cooking device wherein each cooking section of the device can be dismantled completely to provide cleaning of all of the parts of each cooking assembly.

Another feature of the present invention is to provide an improved portable cooking device wherein both cooking sections have gas-fired burners with all of the burners being supplied with a common-pressurized gas reservoir.

Another feature of the present invention is to provide an improved portable cooking device wherein both cooking sections of the device are isolated from the casing and ventilated whereby the casing does not overheat thus permitting the device to be utilized on a table top or other support without causing any burning damage thereto.

Another feature of the present invention is to provide an improved portable cooking device which is easy to assemble and disassemble, lightweight, easy to carry, and which is compact and self-contained.

According to the above features, from a broad aspect, the present invention provides a portable cooking device comprising a housing having two concave cooking sections hinged together along a respective side wall whereby the sections may be disposed side by side with their open ends facing upwardly and displaceable to be juxtaposed with their open ends facing one another. The sections each have a bottom wall, opposed side walls and opposed end walls. One of the concave cooking sections has a heat-generating element secured therein beneath a heat transmitting support frame. The other of the concave cooking sections has a gas-burner assembly supportable on the bottom wall thereof below a further heat transmitting support frame. The assembly has an open top and pan with a gas-burner element disposed substantially centrally therein. A flame shield extends over the burner. Support means is provided to maintain the pan spaced from the side walls and end walls of the other section. Ventilation means is provided to ventilate the pan.

BRIEF DESCRIPTION OF DRAWINGS

An example of the preferred embodiment of the present invention will now be described with reference to the accompanying drawings in which:

FIG. 1 is a perspective view of the portable cooking device of the present invention shown in its position of use;

FIG. 2 is a perspective view of the portable cooking device of the present invention shown in its portable position with both cooking sections juxtaposed;

FIG. 3 is a section view through the portable cooking device in its position of use;

FIG. 5 is a section view through the gas-fired barbecue cooking section;

FIG. 6 is a partly fragmented side view of the burner element shown in FIG. 5;

FIG. 7 is a fragmented section view of the gas-fired barbecue cooking section; and FIG. 8 is an end view showing the gas line connecting bridge interconnecting both cooking sections.

DESCRIPTION OF PREFERRED EMBODIMENTS

Figure 4:
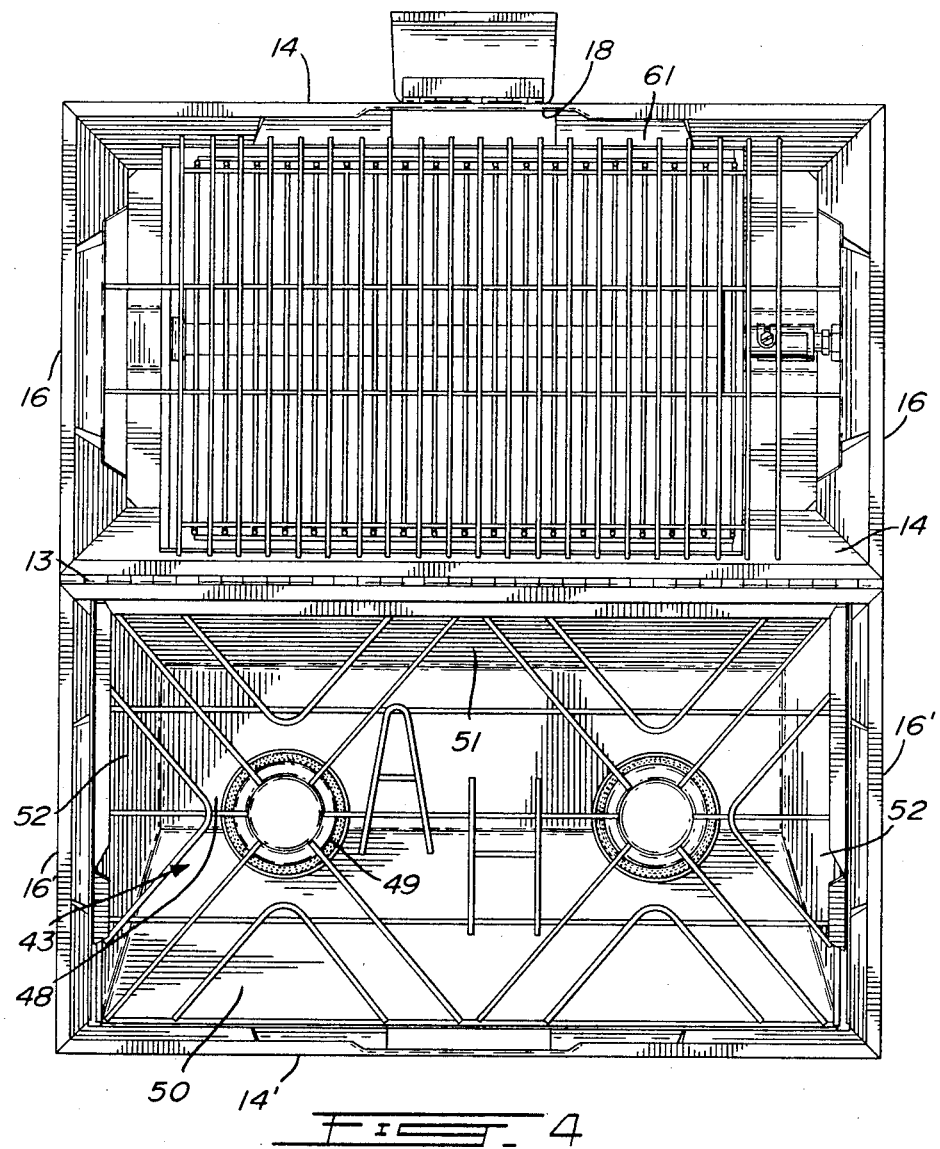
FIG. 4 is a top view of the portable cooking device when in its position of use.

Referring now to the drawings and more particularly to FIGS. 1 to 4, there is shown generally at 10 the portable cooking device of the present invention. The device is comprised of a housing consisting of two concave cooking sections 11 and 12 hinged together by an elongated hinge 13 interconnecting the top edge of a respective side wall 14 and 14'. As shown in FIG. 1, the cooking sections 11 and 12 may be disposed in side-by-side relationship with their open ends facing upwardly whereby to constitute two separate cooking sections with the section 11 being a gasfired cooking stove or other type cooking unit and the section 12 being a gas-fired barbeque, or still another type of cooking unit. When both concave cooking sections are juxtaposed, as shown in FIG. 2, they constitute a portable carrying case.

As is more clearly seen in FIGS. 3 and 4, each concave cooking section 11 and 12 has a bottom wall 15 and 15', opposed side walls 14 and 14' and opposed end walls 16 and 16'. A handle 17 is formed in opposed outer edges of the cooking sections when juxtaposed and constituted by handle hole 18 and a clamp plate 19 which will be described in more detail later. Each of the concave sections has indented legs 20 formed in the bottom walls 15 thereof to support the bottom wall above a support surface.

Referring additionally to FIGS. 5, 6, and 7, there will now be described the construction of the cooking section 12 which constitutes a gas-fired barbecue. This section has a gas burner assembly 21 which is comprised by a pan 22 formed as a concave curved heat reflector dish. The dish 22 is supported spaced from the bottom wall 15' by a secondary heat deflector plate 23 which is constituted by a metal plate having a heat reflective outer surface and formed of stainless steel or other suitable metals, and shaped with angulated support side walls 24' whereby to reflect heat upwardly towards the open sides of the dish 22'. A plurality of ventilating holes 23' are provided in these support side walls 24' for venting heat from underneath the support deflector plate 24. The dish 22 is attached by suitable means, such as weld spots (not shown) to the apex portion of the deflector plate 24 to maintain the dish elevated from the bottom wall and spaced from the side and end walls 14' and 16' respectively. Accordingly, there is a clearance formed about the dish 22 whereby the dish may be ventilated by vent means, as will be described later. This spacing is maintained by the configuration of the deflector plate 24 which is a rectangular plate having the outer opposed side edges thereof located along the intersecting joint 25 formed by the bottom wall 15' and the side walls 14'. Thus, the dish 22 is always maintained in an accurate position. The dish 22 and its deflector support plate 24 are merely supported on the bottom wall 15 and can be removed by simply pulling the assembly out of the concave section 12.

A gas-fired elongated burner tube 26 is secured within the dish 22 and extends substantially centrally therein spaced over the curved reflecting side wall 27. The tube has a plurality of flame orifices 28 on each side thereof to direct flames 29 in the direction of the curved side walls of the heat reflector dish 22. A flame shield 30 is secured to the top portion of the tube 26 and a further lower shield 31 is secured under the tube whereby to define a flame-directing throat therebetween to direct the flame and the heat towards the curved reflecting side wall 27 of the pan 22. The upper shield 30 has a concave cross-section whereby to collect food drippings on the top face thereof whereby to protect the burner and flames from these drippings. These shields 30 and 31, the pan 22, and the reflector support plate 24 may all be constructed of stainless steel for ease of cleaning and to provide a better reflective surface.

As herein shown, the dish 22 is formed as a rectangular pan having a curved rectangular wall 27 which is herein shaped on a 12-inch radius. Opposed transverse end walls 32 secure the rectangular wall 27 on its proper curve. The burner tube 26 is detachably secured to one of these end walls 32 and to do so the tube 26 is provided with a securing end formed with a right angle flanged end 33 having a threaded hole 34 therein which is aligned with a hole (not shown) provided in one of the end walls 32 and secured by a fastener 35 extending through these aligned holes. The burner tube assembly, including the shields 30 and 31, is therefore removable by simply undoing the fastener 35 after the pan assembly is lifted from the concave cooking section 12. The free end of the burner tube 26 extends through a hole provided in the opposed end wall 32 and constitutes a gas inlet nozzle receiving end 36. That end is provided with a vent sleeve 37, which is well known in the art, to admit air at the inlet end as is necessary to maintain proper air mixture with the gas fed to the burner tube 26.

A pair of holes 38 is provided in opposed end walls 32 of the dish 22 and are disposed in a common plane whereby to receive therein wire ends 39' of a support frame 39 for supporting a heat retention product, such as lava rocks 40, in close proximity to the burner assembly 26. As herein shown, the support frame 39 is formed of a lattice of transverse wires 41 with a pair of such wires having their ends 39' extending through the respective holes 38 whereby to support the frame 39 in a horizontal plane over the burner assembly. To remove the frame it is merely necessary to displace the frame in the horizontal plane with a pair of the wire ends sliding out of its respective hole 38. A heat transmitting support frame 42 is securable to the opposed end walls 16' of the concave cooking section 12 and also formed of a lattice of wires whereby to support foodstuff over the hot lava rocks 40 for cooking.

The description of the gas-fired cooking section 11 will now be described. This cooking section can also be dismantled as can the barbecue cooking section 12 and comprises a heat reflector pan 43 which is supported spaced from the bottom wall 15 and side and end walls 14 and 16. The pan is freely supported between a support plate 44 and two gas lines 45 which have a connecting end 46 extending through respective aligning holes 47 provided in the bottom wall 48 of the heat reflector pan 43 whereby to align the pan substantially in position. Conventional disc-shaped nozzles 49 are threadably secured over the connecting ends 46 of the gas lines 45 whereby to permit the pan 43 to be removed from the concave cooking section 11. As herein shown, the heat reflector pan has a front wall 50, an end wall 51, and opposed side walls 52, all of which are angulated towards the burner 49 whereby to reflect heat towards the burner and rearwardly towards a collapsible wall assembly 53, when positioned in operable vertical position extending above the open end of the section 11, as is shown in FIGS. 1 and 3. The collapsible wall assembly 53 comprises a rectangular rear wall 54 hinged at a lower edge 55 to an elongated top edge portion of the rear wall 51 of the pan 43, and side walls 55 hinged along the vertical side edges 56 of the rear wall. Accordingly, the side walls 55 are foldable in the direction of arrow 57 towards the rear wall 54 and then the rear wall is folded downwardly against the heat transmitting support frame 58 supported along an edge flange wall portion 59 of the heat reflector pan 43.

Both the heat reflector pan assembly 43 and the gas burner assembly 21 are properly ventilated through their respective concave cooking housings by the provision of ventilation openings which will now be described. These ventilation openings are provided as slotted openings 60 in the adjacent hinged side walls 14 and 14' of the cooking device as shown in FIG. 4. In the opposed side wall and the respective end walls of the concave cooking sections, which are outwardly angulated, there is formed right angle wall sections such as shown by reference numeral 61 in FIGS. 2 and 3, and these form vent openings 62 to the sides of this vertical wall and the angulated side walls or end walls for the entry of surrounding outside air. The hot combustion gases in both cooking assemblies create a current flow causing air to circulate into the concave sections in the direction as shown by arrows 63 in FIG. 5 to create an upward draft and to cool the side walls and bottom walls of the concave sections.

The right angle wall sections 61 also provide for the connection of one or more gas line connectors 64 whereby these connectors extend substantially horizontally outside the frame. It is preferable to have these right angle wall sections 61 at least on two common end walls 16 and 16', as shown in FIG. 8, whereby a gas line connecting bridge 65 may be provided to interconnect two gas line connectors, one for each concave section, one disposed in side-by-side relationship, whereby a single pressurized gas reservoir (not shown) can supply both cooking sections which may be operated at the same time. This gas line connecting bridge is constituted by a metal protecting frame 66 having a T-shaped gas line therein and having a central gas inlet connector 67 and opposed outlet gas connectors provided with regulators 68 to control the amount of gas fed to each of the cooking sections.

As previously described, when the two concave sections are juxtaposed there is formed a handle assembly 17. As shown in FIGS. 3 and 4, a handle hole 18 is formed in the outer ones of the opposed side walls 14 and 14' of each concave section above the right angle wall section 61 and below a vertical side wall edge portion 14". The hinge clamp plate 19 has a hinge 69 which connects the plate 19 to a lower edge of one of the side wall edge portions 14" whereby to pivot the clamp plate 19 across juxtaposed side wall edge portions 14" when the sections are juxtaposed. The outer end edge of the clamp plate 19 has a retention lip 70 which clamps over the lower edge adjacent the handle of the opposed concave section whereby to retain both sections clamped in juxtaposed position and further providing for a smoother and more rigid handle for transporting the cooking device.

It is within the ambit of the present invention to cover any obvious modifications of the example of the preferred embodiment described herein, provided such modifications fall within the scope of the appended claims.

I claim:

1. A portable cooking device comprising a housing having two concave cooking sections hinged together along a respective side wall whereby said sections may be disposed side by side with their open ends facing upwardly and displaceable to be juxtaposed with their open ends facing one another; said sections each having a bottom wall, opposed side walls and opposed end walls; one of said concave cooking sections having a heat generating element secured therein beneath a heat transmitting support frame, the other of said concave cooking sections having a gas burner assembly supportable on said bottom wall thereof below a further heat transmitting support frame, said assembly having an open top end pan in the form of a concave curved heat reflector dish which has a gas burner element disposed substantially centrally therein, a flame shield over said burner, and support means to maintain said reflector dish spaced from said side walls and end walls of said other section, said support means being a secondary heat reflector plate having opposed angulated support side walls to support said heat reflector dish elevated from said bottom wall, said heat reflector dish being dimensioned to fit inside said other section spaced from said opposed side and end walls thereof, and ventilation means to ventilate said pan.

2. A portable cooking device as claimed in claim 1 wherein said one section is a gas burner stove, said other section being a barbecue gas burner assembly.

3. A portable cooking device as claimed in claim 1 wherein said burner is detachably secured to said heat reflector dish and wherein there is further provided a detachable heat retention product support frame securable to said heat reflector dish intermediate said burner and said further heat transmitting support frame.

4. A portable cooking device as claimed in claim 3 wherein said heat retention product is lava rock.

5. A portable cooking device as claimed in claim 3 wherein said further heat transmitting support frame is a wire mesh frame which is detachably secured to said opposed end walls of said other section.

6. A portable cooking device as claimed in claim 3 wherein said burner is an elongated burner tube having a plurality of flame orifices on opposed sides thereof to direct flames in the direction of opposed portions of said curved side wall of said heat reflector dish, and wherein a further shield is supported under said burner.

7. A portable cooking device as claimed in claim 6 wherein said flame spreader shield and said further shield are elongated rectangular shields and form between them a flame directing throat to direct said flame in the direction of said opposed portions of said curved side wall, said upper shield being shaped as a concave upper surface to collect food drippings therein.

8. A portable cooking device as claimed in claim 3 wherein said heat reflector housing has a top surface formed of reflecting material, said secondary heat reflector plate also having an outer surface formed of reflecting material.

9. A portable cooking device as claimed in claim 3 wherein said heat reflecting dish and said secondary heat reflector plate are constructed of stainless steel material.

10. A portable cooking device as claimed in claim 6 wherein said burner tube has a detachable securing end and a gas inlet nozzle receiving end, said securing end being a flanged end abutting an end wall of said heat reflector dish, and fastener means to detachably secure said flanged end to said end wall, said flange supporting said tube across said dish elevated from the inner wall thereof with said inlet nozzle receiving end extending through an opening in an opposed end wall of said dish.

11. A portable cooking device as claimed in claim 3 wherein said dish is a rectangular pan having a curved rectangular wall shaped on a 12-inch radius and opposed transverse end walls, a pair of holes in said opposed end walls disposed in a common plane, said heat retention product support frame being a wire mesh frame having a pair of opposed support wires removably positionable in respective ones of said pair of holes.

12. A portable cooking device as claimed in claim 1 wherein said angulated support walls are provided with ventilation openings therein.

13. A portable cooking device as claimed in claim 1 wherein said ventilation means is constituted by vent openings in said opposed side and end walls of said other section, at least some of said openings being formed by right angle wall sections formed in angulated side or end walls of said other section, and one or more gas line connectors secured to said right angle wall section.

14. A portable cooking device as claimed in claim 1 wherein a collapsible wall assembly is secured adjacent said hinged side wall of said one of said sections, and a heat reflector pan secured under said heat generating element and spaced from said bottom wall and said side and end walls of said one of said sections; said heat reflector pan having angulated front, rear and side walls to reflect heat toward said wall assembly when positioned to an operable vertical position extending above said open end of said one of said sections.

15. A portable cooking device as claimed in claim 14 wherein said heat generating element is constituted by one or more detachably securable burner nozzles, said heat reflector pan having a bottom wall with one or more posts therein to receive a gas line connecting end to which said burner nozzles are connected, said collapsible wall assembly being hingedly secured to said rear wall of said heat reflector pan and defined by a hinged flat rear wall to which is connected opposed hinged side walls.

16. A portable cooking device as claimed in claim 15 wherein said ventilation means is constituted by vent openings in said opposed side and end walls of said one of said sections, at least some of said openings being formed by right angle wall sections formed in angulated side or end walls of said one section, and one or more gas line connectors secured to said right angle wall section(s) and to a gas line having said gas line connecting end.

17. A portable cooking device as claimed in claim 2 wherein a common one of said opposed end walls of said sections has a right angle wall section formed therein to receive a gas line connector, a gas line connecting bridge interconnecting said gas line connector of each said sections when disposed in side-by-side relationship, said bridge having a gas inlet connector for connection to a pressurized gas reservoir.

18. A portable cooking device as claimed in claim 16 wherein a handle hole is formed in an outer one of said opposed side wall of both said housing concave sections above a right angle wall section formed therein and below a vertical side wall edge portion, and a hinge clamp plate hinged to a lower edge of one of said side wall edge portions for clamping retention across juxtaposed side wall edge portions when said sections are juxtaposed and forming a handle for transporting said cooking device.

* * * * *